United States Patent [19]
Gasper

[11] 3,875,902

[45] Apr. 8, 1975

[54] MOVEABLE WALL FOR AN ANIMAL CAGE

[76] Inventor: Frederick A. Gasper, Route 4, Fairbury, Nebr. 68352

[22] Filed: Sept. 14, 1973

[21] Appl. No.: 397,609

[52] U.S. Cl. .................................................. 119/17
[51] Int. Cl. ........................................... A01k 29/00
[58] Field of Search ................ 119/17, 18, 19, 21; 217/64

[56] References Cited
UNITED STATES PATENTS

| 313,319 | 3/1885 | Goddard | 119/21 |
| 1,179,703 | 4/1916 | Deau | 119/17 |
| 1,329,344 | 1/1920 | Spreckels | 217/64 |
| 1,667,998 | 5/1928 | Woodworth | 119/17 UX |

*Primary Examiner*—Hugh R. Chamblee
*Attorney, Agent, or Firm*—Henderson & Strom

[57] ABSTRACT

A moveable wall for an animal cage having a perforated bottom, the moveable wall having an upright gridlike barrier affixed perpendicular to a triangular base having a hook means thereon to lock the moveable wall within the animal cage at any predetermined position therein. The moveable wall is useful to lockably adjust the size of the cage, and is also useful for urging the animals out of the cage.

3 Claims, 5 Drawing Figures

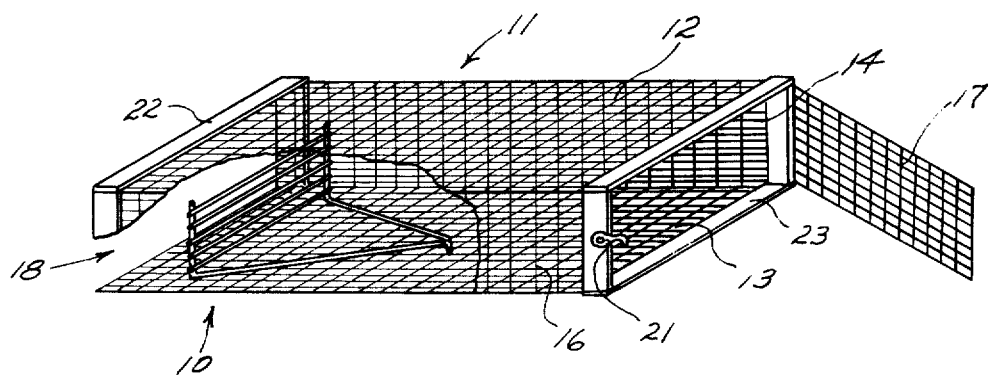
FIG. 1
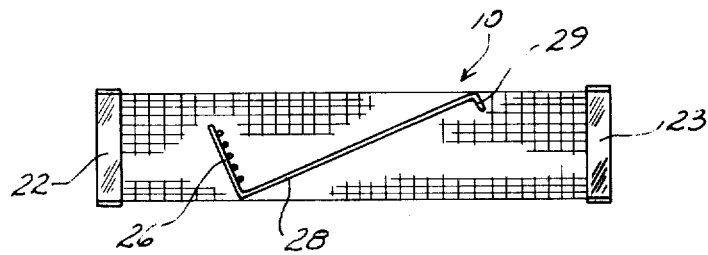
FIG. 2
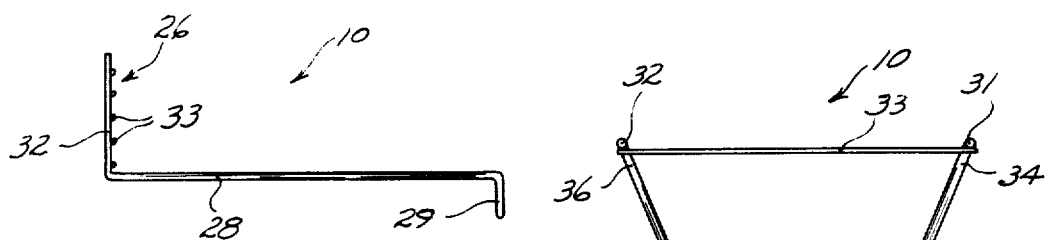
FIG. 3
FIG. 4
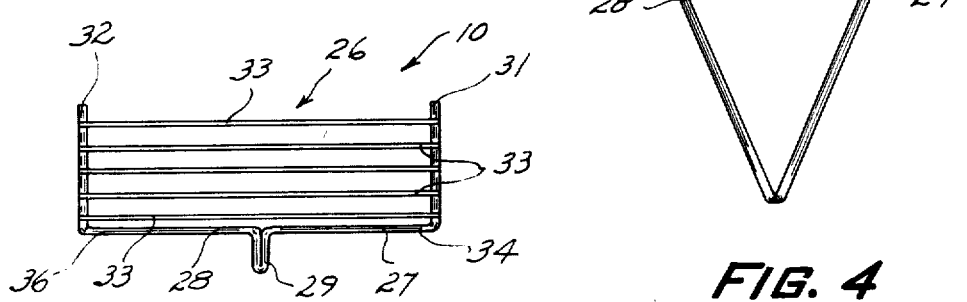
FIG. 5

MOVEABLE WALL FOR AN ANIMAL CAGE

BACKGROUND OF THE INVENTION

Animal cages, particularly cages for fowl, generally consist of six walls with the sixth side having a door and possibly a feed bin formed therein. Typically such cages are constructed of a light frame defining the edges of the cage and a wire mesh (e.g. "chicken wire") covering the frame. The use of the wire mesh permits adequate ventilation and allows offal to fall through thereby keeping the cage sanitary. Cages of this standard design require a considerably expenditure of time and or effort to effectuate removal of the fowl, as is required to clean the cages or when the chickens are to be slaughtered. The process of removing the fowl is accomplished by tilting the cage to dump out the fowl or by the operator reaching into the cage and pulling the individual fowl therefrom. Because the cages are often stacked, tilting the cage is inefficient as the upper cages must first be removed before a lower cage may be tilted. In addition, the weight of the cage often necessitates the use of several operators or complicated and expensive equipment to tilt the cage as well as presenting a safety hazard. If the operator attempts to manually pull the individual fowl from the cage, he runs a risk of being pecked or scratched and the chance of contracting disease from the contaminated lacerations. In many instances the cages are more than three feet deep and the innermost fowl are beyond an arm's reach, such a configuration makes manual removal of the fowl quite difficult.

When fowl are raised for profit, it is desirable to minimize movement of the fowl, since any such unnecessary expenditure of energy by the fowl decreases the yield (e.g. the ratio of the pounds of feed required to add a pound of flesh to the fowl). For this reason, the fowl should be tightly confined. As the fowl grow in size, some fowl must be occasionally removed from the cage to allow further growth of the remaining fowl.

It should also be noted that the typical six sided cage is difficult to clean, since entry into the interior of the cage is typically limited to one door in one wall. Cleaning would be much easier if the cage had more than one openable side.

SUMMARY OF THE INVENTION

This invention relates generally to animal cages, and more particularly to a moveable wall for an animal cage. The moveable wall consists of a barrier that is slidably received within the cage and a pair of rods affixed at their one ends to the barrier and extending longitudinally toward the door to the cage. The other ends of the rods are connected and formed into a hook that is releasably engagable with the floor of the cage.

It is therefore an object of this invention to provide a moveable wall for an animal cage that is operable to urge animals out of a cage without requiring the tilting of the cage.

Another object of this invention is to provide a moveable wall for an animal cage that is operable to urge animals out of a cage that is too large to permit manual extraction of the animals.

Still another object of the invention is to provide a moveable wall for animal cages that reduces the risk that the operator will become injured through laceration and or infectious disease.

An additional object of this invention is to provide a moveable wall for animal cages that is operable to closely confine the animals within the cage.

Still an additional object of the invention is the provision of a moveable wall for animal cages that allows the cage to expand to compensate for growth of the animals, rather than requiring that some of the animals be transferred to a separate cage.

Yet another object of the invention is to provide an animal cage having a moveable wall disposed opposite the cage door thus providing ease in the cleaning thereof.

Yet still another object of this invention is the provision of a moveable wall for animal cages that does not require expensive or complicated equipment to effectuate removal of the animals.

These objects and other features and advantages becomre more readily apparent upon reference to the following description when taken in conjunction with the appended drawings.

In the drawings, as hereinafter described, a preferred embodiment is depicted; however, various other modifications and alternate construction can be made thereto without departing from the true spirit and scope of this invention.

BRIEF DESCRIPTION OF THE DRAWINGS

FIG. 1 is a cut away perspective view of a fowl cage showing the moveable wall in place;

FIG. 2 is a side elevational view of the cage showing the moveable wall in an alternative position;

FIG. 3 is a side elevational view of the moveable wall without the cage;

FIG. 4 is a top plan view of the moveable wall; and

FIG. 5 is a rear end view of the moveable wall.

DESCRIPTION OF THE PREFERRED EMBODIMENT

The moveable wall for animal cages is depicted in the figures generally at 10. In FIG. 1, the moveable wall for animal cages is shown operably disposed within a fowl cage 11. For the purpose of clarity, further discussion of the moveable wall for animal cages 10 will be limited to its use within the fowl cage 11. However, it should be remembered that the moveable wall 10 may be readily adapted for use in any animal cage.

The fowl cage 11 consists of five sides, 12, 13, 14, 16 and 17; a top, a bottom, a right side, a left side, and a door respectively, thereby forming a rectangular receptical. An opening 18 opposite the door side 17 distinguishes the fowl cage 11 from a standard six sided fowl cage (not shown) wherein a wall (not shown) would close the opening 18. The fowl cage 11 is constructed by covering two spaced apart rectangular end frames 22 and 23 with wire mesh 24 so as to form an open ended boxlike configuration. Hingedly disposed on one frame 23 is the rectangular door 17 which is also fabricated from the wire mesh 24, and which is releasably secured to the frame 23 by a latch 21.

In FIGS. 3, 4 and 5, the moveable wall 10 is shown in greater detail, consisting of three elements: a barrier 26, a pair of pull rods 27 and 28, and a hook unit 29.

The barrier 26 (FIGS. 3 and 5) is a rectangular grill formed from two spaced apart upright posts 31 and 32 and a plurality of horizontal spaced rods 33 affixed thereto at their ends. Thus, the barrier 26 resembles a vertically disposed wide ladder. Dimensionally, the barrier 26 is slightly smaller than the interior dimensions of the frames 22 and 23 thus permitting the barrier 26 to slide longitudinally in the fowl cage 11. However the barrier 26 is large enough to prohibit the fowl (not shown) from escaping through the gap between the interior of the fowl cage 11 and the exterior of the barrier 26. It should be noted, upon installation of the barrier in the cage, that the barrier 26 functions as a closure for the opening 18, which would otherwise be effectuated by a permanent wall as in the case of a standard six sided fowl cage.

Referring now to FIGS. 3 and 4, the pull rods 27 and 28 form the sides of an isoceles triangle lying in a horizontal plane. The spaced apart ends 34 and 36 of the pull rods 27 and 28 respectively, are affixed to and integral with the posts 31 and 32 respectively, at the lowermost ends thereof. Dimensionally, the length of the pull rods 27 and 28 is approximately three times the height of the barrier 26. Thus the pull rods 27 and 28 form a V-shaped base which prevents the barrier 26 from tipping over. In addition, the moveable wall 10 is typically placed in the fowl cage 11 such that the pull rods 27 and 28 lie on the bottom 13 of the cage 11, and extend from the barrier 26 toward the door 17. When in such a position, the operator needs merely to grasp the rods, pull thereon to displace the moveable wall 10 toward the door 17, thereby urging the fowl out of the cage 11. The relatively long length of the pull rods 27 and 28 permits the ready removal of fowl from cages that are more than an arm's length deep, since the operator needs to reach only part way into the cage to effectively grasp the pull rods 27 and 28.

The hook unit 29 (FIGS. 3 and 5) consists of a perpendicular projection from and integral with the pull rods 27 and 28 at the point of their convergence. The hook unit projects from the pull rods 27 and 28 from the opposite side thereof from which the posts 31 and 32 project. The purpose of the hook unit 29 is to provide a means of locking the moveable wall 10 to the cage 11 in any of a plurality of positions. This purpose is accomplished by inserting the hook unit 29 into any of the openings in the wire mesh of the bottom 13.

In operation, (FIGS. 1 and 2) the moveable wall acts as a closure for the opening 18 in the cage. Even if the hook unit is unlocked from the bottom 13 of the cage 11, the moveable wall 10 can only be rotated through a small angle, since the converging ends of the pull rods 27 and 28 will contact the top 12, thereby preventing further rotation. The moveable wall 10 is depicted in such a position of maximum rotation in FIG. 2. It should be noted that only a small angle of rotation is essential, since a large angle of rotation would open the gap between the top of the barrier 26 and the top 12 of the cage 11 thereby allowing the fowl to escape out the opening 18. In addition, the moveable wall 10 readily permits the expansion of the cage 11 to accomodate the growth of the fowl. By placing and locking the moveable wall 10 across the approximate longitudinal middle of the cage 11, the cage will accomodate a plurality of chicks. As the chicks grow, the moveable wall 10 can be placed and locking progressively further from the door 17 thereby increasing the useable volume of the cage 11.

I claim:

1. A moveable wall for an animal cage having a perforated bottom wall, two side walls, a top wall, an end wall, and an open end, said moveable wall comprising:

a barrier moveably disposed within said animal cage thus forming an enclosure defined by said barrier, said end wall and at least a portion of said two side, top and bottom walls;

elongated means having one end affixed to said barrier and having an other end spaced from said barrier and disposed in a first position in contact with said bottom wall, said elongated means being of sufficient length that when said other end is moved from said first position to a second position in contact with said top wall substantially no gap is created between said barrier and said two side, top and bottom walls through which animals contained in said enclosure can escape; and a hook unit affixed to said elongated means at said other end, wherein said hook unit is operable to engage said perforated bottom wall of said animal cage to prevent horizontal movement of said barrier.

2. A moveable wall for use with an animal cage as defined in claim 1 wherein said hook unit is a depending projection from said elongated means other end wherein said projection will coact with said perforated bottom wall by projecting through one of the perforations therein.

3. A moveable wall for use with an animal cage as defined in claim 2 wherein said elongated means is a pair of rods, each said rod connected at one end thereof to said barrier with said rods one ends spaced apart and said rods other ends connected together with said hook unit affixed thereto.

* * * * *